C. STROM.
JOINT.
APPLICATION FILED MAR. 29, 1918.
1,301,883.  Patented Apr. 29, 1919.
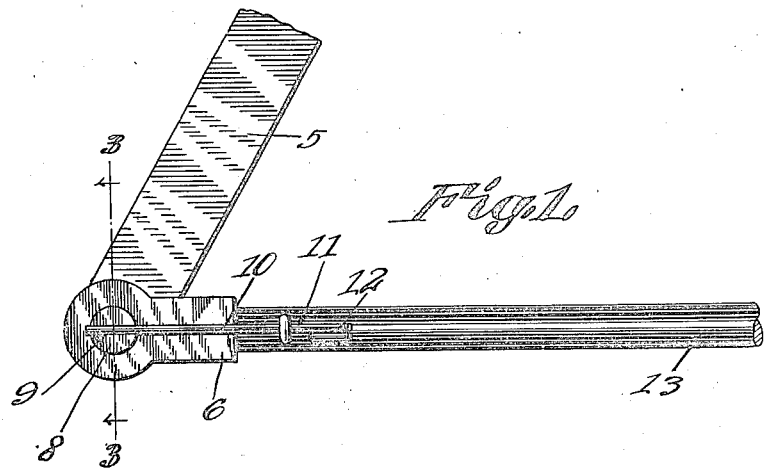
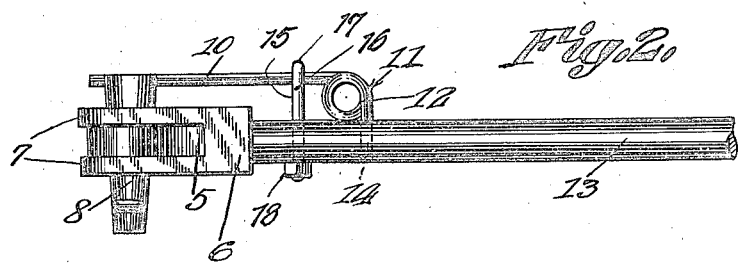
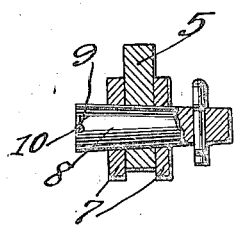
C. Strom
Inventor
Witnesses
Norman T. Whitaker
his Attorney

UNITED STATES PATENT OFFICE.

CHRISTOPHER STROM, OF ALLIANCE, OHIO.

JOINT.

1,301,883.   Specification of Letters Patent.   Patented Apr. 29, 1919.

Application filed March 29, 1918. Serial No. 225,508.

*To all whom it may concern:*

Be it known that I, CHRISTOPHER STROM, a citizen of the United States, and a resident of Alliance, in the county of Stark and State of Ohio, have invented new and useful Improvements in Joints, of which the following is a specification.

This invention relates to joints and has particular reference to that class of joints used in connecting certain elements employed in the construction of automobiles.

An important object of the invention is to provide in a device of the above mentioned character a means whereby certain elements connected in accordance with my invention may be maintained in a close relation with respect to each other at all times, thereby eliminating any rattling or noise which would otherwise be created.

A further object of the invention is to provide in a device of the above mentioned character a means whereby the elements connected in accordance with my invention may be easily and readily disassociated one from the other.

A further object of the invention is to provide a device of the above mentioned character which may be easily applied to or installed upon the conventional form of elements with which it is particularly adapted to be used without altering or changing the form of the elements with which it is desired to be used.

A further object of the invention is to provide a device of the above mentioned character which is strong, durable, and simple in construction, cheap to manufacture, and reliable in operation.

Other objects and advantages of the invention will be apparent during the course of the following description.

In the accompanying drawings, forming a part of this specification and in which like numerals are employed to designate like parts throughout the same, Figure 1 is a side elevation of the device embodying my invention, the same being shown as connecting an emergency lever with a brake rod such as are employed in automobile construction, Fig. 2 is a bottom plan view of the same, and Fig. 3 is a transverse sectional view taken on line 3—3 of Fig. 1.

In the drawings, wherein for the purpose of illustration is shown the preferred form of my invention, the numeral 5 indicates an emergency brake lever such as is commonly employed in automobile construction. To the end of the brake lever 5 there is connected an enlarged head 6 having a pair of parallel disposed arms 7 between which an end of the brake lever 5 is adapted to be retained. As a means for retaining the brake lever 5 in connection with the enlarged head 6 there is provided a tapered pin 8 which is passed through each of the arms 7 and the end of the brake lever confined therebetween. The larger end of the tapered pin 8 is provided with a groove 9 adapted to receive therein an elongated spring arm 10 of a spring 11 which is coiled as shown at 12 and secured to a brake rod 13 as shown at 14.

The numeral 15 indicates as a whole a means for varying the tension of the spring arm 10, which means comprises an elongated arm 16 passed through the brake rod 13. This arm is provided at one end with a yoke 17 adapted to engage the spring arm 10 as shown while the other end of the arm 16 is provided with a nut 18 which serves not only as a means for retaining the tension device in position with respect to the other element associated therewith but also as a means for varying the tension of the spring arm 10.

In assembling the preferred form of my invention as shown in Figs. 1 and 2, the tapered pin 8 is passed through each of the arms 7 and that portion of the brake lever 5 confined therebetween whereupon the spring arm 10 is moved into slot 9, which spring arm serves as a means for retaining a tapered pin in the desired position. When the spring arm 10 is moved into the slot 9 the spring tension means 15 may be adjusted by means of the nut 18 to obtain the desired tension within the spring arm 10.

It will be readily understood by those skilled in the art that should the pin 8 or the opening through which it is passed become worn as a result of constant use, the same will be gradually forced forward into the opening carrying the same thereby producing a wear compensating effect and eliminating any noise or rattle which would otherwise be produced.

While I have shown and described my invention as applied to certain elements used in automobile construction I wish it understood however, that the same may be as well applied to other elements which are desired to be connected in a like manner.

It is to be understood that various changes in the shape, size and arrangement of parts may be resorted to without departing from the spirt of my invention or the scope of the subjoined claims.

Having thus described my invention, what I claim as new and desire to secure and protect by Letters Patent of the United States, is:

1. A device of the character described comprising a plurality of elements provided with openings, a tapered pin passed therethrough, a spring member having connection with said pin and one of the elements, and a spring tension adjusting means having connection with said spring member and one of said elements.

2. A device of the character described comprising a plurality of elements provided with openings, a tapered pin passed through said openings and provided at one end thereof with a groove, an elongated spring arm connected to one of said elements and adapted to engage said pin within said groove and a spring tension adjusting means having connection with one of said elements and engaging said spring arm for adjusting the spring tension of the arm.

CHRISTOPHER STROM.